(12) United States Patent
Behnke et al.

(10) Patent No.: US 9,125,342 B2
(45) Date of Patent: Sep. 8, 2015

(54) METHOD AND DEVICE FOR THE STATE DETECTION OF A CUTTING DEVICE

(75) Inventors: Willi Behnke, Steinhagen (DE);
Michael Roggenland, Arnsberg (DE);
Jochen Huster, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 398 days.

(21) Appl. No.: 13/564,073

(22) Filed: Aug. 1, 2012

(65) Prior Publication Data

US 2013/0042591 A1 Feb. 21, 2013

(30) Foreign Application Priority Data

Aug. 16, 2011 (DE) .......................... 10 2011 052 726

(51) Int. Cl.
*A01D 61/00* (2006.01)
*A01D 43/08* (2006.01)
*A01F 29/09* (2010.01)
*A01F 29/22* (2006.01)

(52) U.S. Cl.
CPC ............ *A01D 43/085* (2013.01); *A01F 29/095* (2013.01); *A01F 29/22* (2013.01)

(58) Field of Classification Search
USPC ....... 56/10.2 R, 12.1, 16.4 R, 16.4 A, 16.4 D, 56/249
See application file for complete search history.

(56) References Cited

U.S. PATENT DOCUMENTS

| 4,479,346 | A | * | 10/1984 | Chandler | 56/250 |
|---|---|---|---|---|---|
| 4,614,305 | A | * | 9/1986 | Fekete et al. | 241/36 |
| 4,799,625 | A | | 1/1989 | Weaver, Jr. et al. | |
| 5,018,342 | A | * | 5/1991 | McClure et al. | 56/10.5 |
| 5,704,199 | A | * | 1/1998 | Paquet et al. | 56/10.2 B |
| 6,146,268 | A | * | 11/2000 | Behnke et al. | 460/4 |
| 6,886,314 | B2 | * | 5/2005 | Pirro et al. | 56/10.2 R |
| 2005/0072135 | A1 | * | 4/2005 | Kormann | 56/500 |
| 2005/0076631 | A1 | * | 4/2005 | Wolf et al. | 56/500 |
| 2007/0062288 | A1 | * | 3/2007 | Behnke et al. | 73/587 |
| 2012/0055135 | A1 | * | 3/2012 | Brockhan-Luedemann et al. | 56/249.5 |

FOREIGN PATENT DOCUMENTS

EP 0 291 216 11/1988

* cited by examiner

*Primary Examiner* — Alicia Torres
(74) *Attorney, Agent, or Firm* — Michael J. Striker

(57) ABSTRACT

A method for state detection of a cutting device for agricultural crop is described. The cutting device is formed with a cutting tool set into rotation with respect to a shear bar operates such that a clearance position of the shear bar is changeable with respect to the cutting too. The method includes assigning at least two interspaced sensors for detecting vibrations to the shear bar caused by the cutting tool upon contact with the shear bar, transmitting signals generated by the sensors to a common signal analysis device and, the common signal analysis device comparing the signals and determining a state of the cutting device.

9 Claims, 3 Drawing Sheets

METHOD AND DEVICE FOR THE STATE DETECTION OF A CUTTING DEVICE

CROSS-REFERENCE TO A RELATED APPLICATION

The invention described and claimed hereinbelow is also described in German Patent Application DE 10 2011 052 726.5 filed on Aug. 16, 2011. This German Patent Application, subject matter of which is incorporated herein by reference, provides the basis for a claim of priority of invention under 35 U.S.C. 119(a)-(d).

BACKGROUND OF HE INVENTION

The invention relates to a method and a device for the state detection of a cutting device for agricultural crop.

Agricultural harvesting machines such as self-propelled forage harvesters are equipped with a chopping assembly that comprises a chopper drum that rotates opposite a stationary shear bar. Crop that reaches an engagement region formed by the chopper drum and the shear bar is fragmentized by the interaction of cutting blades, which are attached to the rotating chopper drum, with the shear bar.

The cutting blades become worn during operation. The cutting blades are therefore sharpened repeatedly, in order to attain a consistent cutting quality and minimize the cutting forces and, therefore, the drive energy required for chopping. Every time sharpening is performed, material is removed from the cutting blades when the dull cutting edges are sharpened. The result is that the distance between the cutting edges of the cutting blades and the shear bar changes. The chopping process is thereby impaired.

For the chopping process to be precise and energy-efficient, not only is knife sharpness important, but also the distance between the shear bar and the cutting tool. If the distance is too great, a portion of the incoming material may not be cut completely, and greater cutting forces may be required. If the distance is too small, there is a risk that the cutting blades and the shear bar will touch each other, which can result in material damage. Such touching also can cause material and/or entire machine elements to come loose, which is hazardous. A control unit that makes it possible to adjust the clearance position of the shear bar is therefore assigned to the shear bar.

In order to precisely adjust the shear bar using the control unit, for example, after sharpening, it must be possible to precisely detect the clearance position between the shear bar and the cutting tool. This is a technical challenge due, inter alia, to the close clearance, the high rotational speed and possible mechanical loads in the arrangement comprising the cutting tool and the shear bar.

Previously, the clearance between the shear bar and the cutting tool has been determined by moving the shear bar toward the rotating cutting tool until contact occurs, which can be detected by way of "knocking", i.e. periodic contact noises caused by the cutting blades striking the shear bar. The shear bar is then moved away from the cutting tool out of the "contact position", which is detected by knocking, by a certain extent in order to attain a defined clearance.

Although the contact noises produced in the approach are audible, the evaluation thereof by an operator is affected by highly subjective influences. A "knock sensor" is therefore used for detection purposes. The knock sensor is typically a vibration sensor (or a plurality thereof) mounted on the shear bar that detects "knocking" when a threshold value is fallen below. The knock signal therefore indicates that the cutting tool is in contact with the shear bar, on the basis of which a minimal shear bar clearance is deduced.

The disadvantage of this type of clearance determination is that only contact of the shear bar with the cutting tool is detected as such. What often happens, however, is that the shear bar is not oriented parallel to the cutting tool due to uneven wear of the cutting blades or the shear bar, due to loads on the shear bar, due to the shear bar being moved toward the cutting tool in a different manner at the sides, or due to other reasons. Upon movement toward the cutting tool, contact is only partial and the position thereof cannot be determined. It is not possible, therefore, to detect a deviation from the parallel orientation of the shear bar that is aimed for in the cutting process. The clearance position is therefore not set exactly.

In order to nevertheless attain a parallel orientation of the shear bar with respect to the cutting tool, EP 0 291 216 A1 provides that adjusting motors assigned to different ends of the shear bar are actuated individually in order to detect the knock signal generated when only one motor is actuated, at least on the side of the contact. The actual side on which contact takes place, therefore, is not detected, and erroneous detections can occur in practical application, in particular, in the presence of mechanical loads on the shear bar. In addition, a relatively great amount of time is required to actuate the adjusting motors individually.

SUMMARY OF THE INVENTION

The present invention overcomes the shortcomings of known arts, such as those mentioned above.

The present invention provides a method that results in improved state detection of the cutting device, i.e., faster and more accurate detection of the clearance position of the shear bar with respect to the cutting tool and a device for implementing same.

The above-mentioned problem is solved by a method according to claim 1. It is characterized in that at least two interspaced sensors for detecting vibrations are assigned to the shear bar, said vibrations being caused by the cutting tool upon contact with the shear bar, wherein signals generated by the sensors are transmitted to a common signal analysis device that compares the signals and determines a state of the cutting device.

In an embodiment, the invention provides a method for the state detection of a cutting device for agricultural crop, wherein the cutting device comprises a cutting tool that can be set into rotation with respect to a shear bar and wherein the clearance position of the shear bar can be changed with respect to the cutting tool. The method includes assigning at least two interspaced sensors for detecting vibrations to the shear bar, the vibrations caused by the cutting tool upon contact with the shear bar, wherein signals generated by the sensors are transmitted to a common signal analysis device that compares the signals and determines a state of the cutting device.

The inventive method is based on the finding that vibrations caused by mutual contact of cutting tool and shear bar and that can be perceived through the air as contact noises propagate in the shear bar in the form of structure-borne acoustic vibrations at a certain velocity that is material-dependent in particular. The placement of at least two sensors at the shear bar at a distance from one another makes it possible to determine state information about the cutting device by comparing the signals received from sensors, which are located in different positions (each signal representing a "contact noise" detected by the sensor), in a common signal analysis device.

More particularly, the source of the noise, that is, the contact point between shear bar and cutting device, is located by way of a sound transit time measurement carried out by the signal analysis device and a transit time difference determined on the basis thereof, when the placement of the sensors is known. The need to approach the shear bar one side at a time, which is time-consuming, is eliminated. The signal analysis device also can determine the sharpness states of the cutting tool and/or the shear bar on the basis of the comparison of the signals that are received.

In an embodiment, the sensors are structure-borne sound sensors that are disposed at opposite end regions of the shear bar. It is therefore possible to easily assign the sensors to the sides of the shear bar, wherein the exact position of the sensors is determined by making a time-based comparison of the signals that are received. In the simplest case, the signal analysis device deduces information about the origin of the vibration on the shear bar simply on the basis of the presence of the signal from only one sensor Alternatively or in addition thereto, the signal analysis device derives information about the origin of the vibration on the shear bar from the points in time at which signals arrive from different sensors. Such information can simply be an allocation to a particular side or a position could be determined quantitatively by way of calculation.

The signal analysis device determines a time offset in the sense of a transit time difference between the signals from different sensors that are triggered by the same vibration source. Advantageously, the signal analysis device is a microcontroller operating at high frequency that can analyze and/or filter the signals from the sensors at a high sampling rate.

Preferably the signal analysis device carries out a quantitative position determination of the origin of the vibration on the shear bar on the basis of the transit time difference that was determined. To this end, the sound transit time from the origin of the structure-borne acoustic vibration to the particular sensor is first calculated on the basis of the transit time difference that was measured and a specified maximum possible transit time. On the basis of the transit time thusly calculated and a known sound velocity, the distance between the origin of the vibration and the sensor is calculated.

In an embodiment, the signal analysis device derives information about the orientation of the cutting tool with respect to the shear bar on the basis of the duration of a vibration that is received. This is based on the finding that knives that contact the shear bar across the width cause contact noises that last longer than do knives that contact the shear bar only at points. Therefore, the orientation of the cutting tool with respect to the shear bar can is deduced on the basis of the duration of vibrations that are received.

A control unit for adjusting the clearance position of the shear bar is assigned to the shear bar is actuated by a control device that is preferably coupled to the signal analysis device. The control unit advantageously comprises a relevant actuator system, by way of which the clearance of the shear bar with respect to the cutting tool is adjusted and oriented. Such a control unit preferably comprises two actuators, each of which is assigned to one side of the shear bar, is coupled thereto and is actuated separately using the control device, thereby making it possible to adjust the clearance position of the shear bar one side at a time.

In one form, the control device takes into account a state of the cutting device derived by the signal analysis device in the adjustment of a desired clearance position of the shear bar. By consideration therefor, it is possible, in particular, to orient the shear bar in parallel with the cutting tool.

The inventive method described above can be used on different cutting devices having a rotating cutting tool. The cutting tool, however, is preferably a chopper drum equipped with a plurality of knives, as on a self-propelled forage harvester in particular.

Advantageously, the signal analysis device allocates the signals received from the sensors to individual knives of the chopper drum, enabling detection of damage or mis-positionings of individual knives. The signal analysis device is connected to a rotational position sensor that transmits a rotational position of the cutting tool to the signal analysis device. Such a rotational position sensor detects the rotation of the cutting tool in a continuous or periodic manner, thereby permitting the signal analysis device to allocate signals that are received to individual knives on the basis of a synchronization pulse.

A sharpening device for the knives is assigned to the cutting device. The signal analysis device compares the sensor signals from individual knives to one another in order to derive information therefrom as to whether a sharpening procedure should be initiated or halted. The comparison to include consideration of amplitude differences, signal lengths or the number of knife contacts in one revolution, for example. Different knife noises could be used, advantageously, as an indicator to initiate a sharpening procedure. Attaining identical knife contact noises in a sharpening procedure could be used, advantageously, as an indicator to halt the sharpening procedure, which has been carried out successfully.

The signal analysis device detects a state of wear of the shear bar in that there is an interruption of the transmitted signal at the same point in time in the case of vibrations caused by a plurality of knives. If the signal interruption cannot be eliminated by sharpening, then wear is present on the shear bar.

The shear bar and/or machine elements adjacent thereto preferably comprise means for damping structure-borne acoustic vibrations in the shear bar. Such damping is used to reflect structure-borne acoustic vibrations in the shear bar only to the most limited extent possible. Ideally, the damping elements ensure that the sensors are not impaired by disturbing backlash.

The sharpening device comprises an output unit, by way of which the determined state of the cutting device is output to an operator of the cutting device. Such an output unit can operate visually or acoustically, for example, and is disposed in the region of the work station of a machine operator, more particularly in the driver's cab of a forage harvester, to ensure easy access.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

Figure 1:
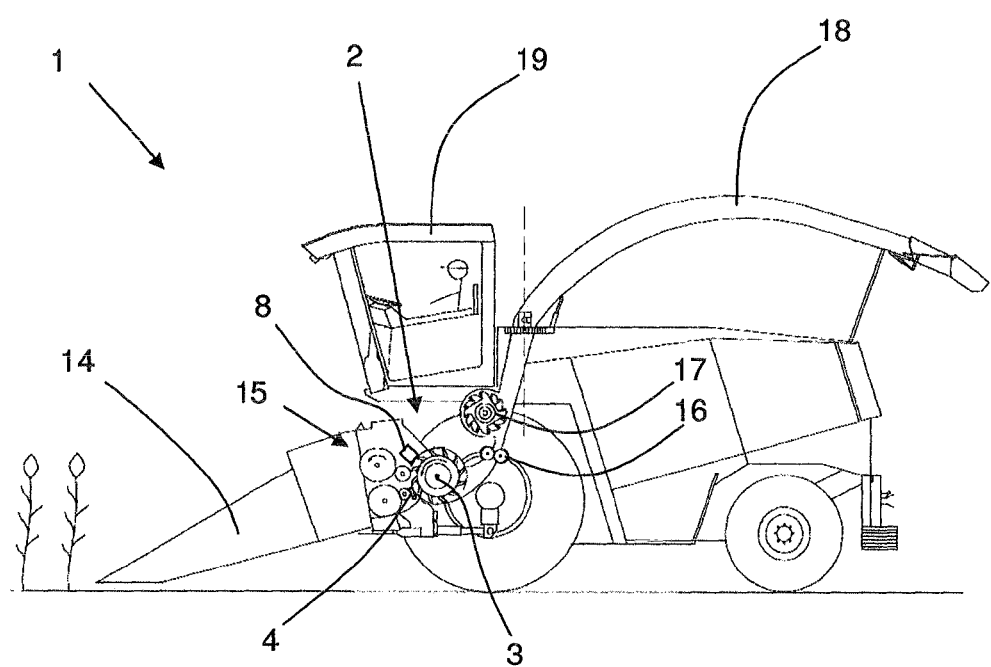
FIG. 1 depicts a self-propelled forage harvester, in a schematic side view.

Fig. shows a schematic side view of a self-propelled forage harvester 1. The forage harvester 1 is equipped with, inter alia, working assemblies such as a front attachment 14, an intake assembly 15 having an assigned sharpening device 8, a conditioning device 16, a post-accelerator 17, a transfer device 18 and a driver's cab 19 for accommodating an operator. During the harvesting operation, the forage harvester 1 is driven over a field and cuts plants from the field using the front attachment 14, in order to feed them to the chopping assembly 2 by way of the intake assembly 15. The chopping assembly 2 comprises a chopper drum 3 that is equipped with a plurality of knives and rotates opposite a stationary shear bar 4.

The design and mode of operation of the chopping assembly 2 are explained in greater detail in the following in association with FIGS. 2 and 3.

The crop is fragmentized as it passes through the chopping assembly 2, is subsequently processed in the conditioning device 16 and accelerated in the post-accelerator 17. The accelerated crop is then ejected out of the forage harvester 1 by way of a conveyor chute disposed behind the driver's cab 19 and by way of the adjoining transfer device 18.

In the harvesting operation depicted in FIG. 1, the chopper drum 3 rotates in the counterclockwise direction in order to chop crop in interaction with the stationary shear bar 4. The crop is conveyed from the intake assembly 15 as a pre-pressed crop mat in the direction of the chopper assembly 2.

Since the knives (not depicted in FIG. 1) become worn during the harvesting operation, they should be sharpened as needed. The sharpening is carried out using the sharpening device 8 to remove material from the knife edges that have become dull. Since material has been removed, the distance between the shear bar 4 and the edge of the knife that is effective in the chopping process has changed after the sharpening procedure. The inventive method and device provide for improved state detection of the chopper assembly 2, more particularly, for the improved detection of the clearance position of the shear bar 4 with respect to the chopper drum 3. Improved detection of the state of the knives and the shear bar also is realized by the inventive device and method.

Figure 2:
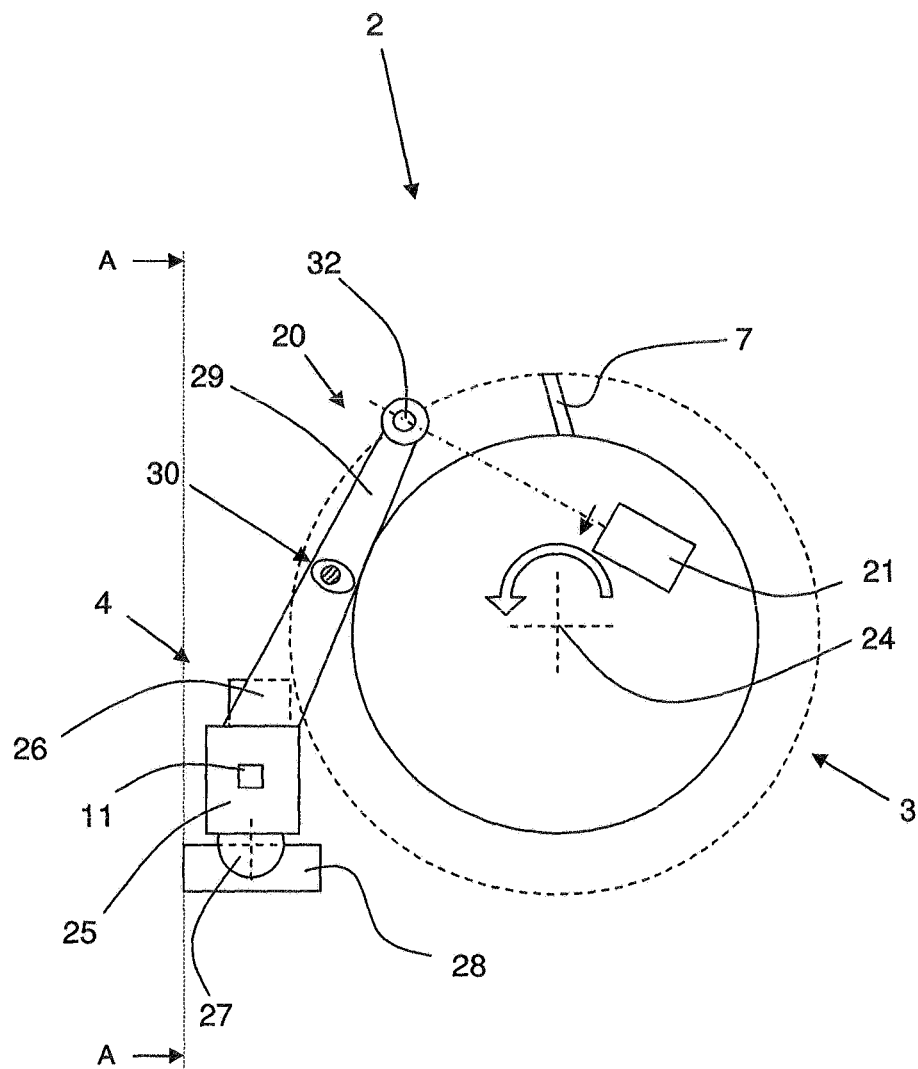
FIG. 2 depicts a chopping assembly, in a schematic side view.

FIG. 2 shows a chopper assembly 2, in a schematic side view that is installed in a forage harvester 1 according to FIG. 1. The chopper assembly 2 comprises a chopper drum 3, which rotates about a rotational axis 24, and a shear bar 4 which is adjusted relative to the chopper drum 3. As an example, a cutting blade 7 attached to the chopper drum 3 is shown, which belongs to a plurality of further cutting blades (not shown) distributed around the circumference. When the chopper drum 3 rotates about the rotational axis 24, the cutting blades 7 sweep over the outer enclosing circle of the chopper drum 3, as indicated by the dashed lines. The radius of the enclosing circle is influenced by the sharpened state of the cutting blades 7.

The shear bar 4 comprises a shear bar carrier 25 on which a counterblade bar 26 is mounted. The shear bar carrier 25 is supported by pivot heads 27 with respect to a fixed (e.g. on the frame of a forage harvester) cross member 28. The shear bar 4 is therefore able to swivel about a swivel axis that extends parallel to the rotational axis 24, wherein the clearance position of the counterblade bar 26 relative to the cutting cylinder 3 is changeable by swiveling the shear bar 4.

Figure 3:
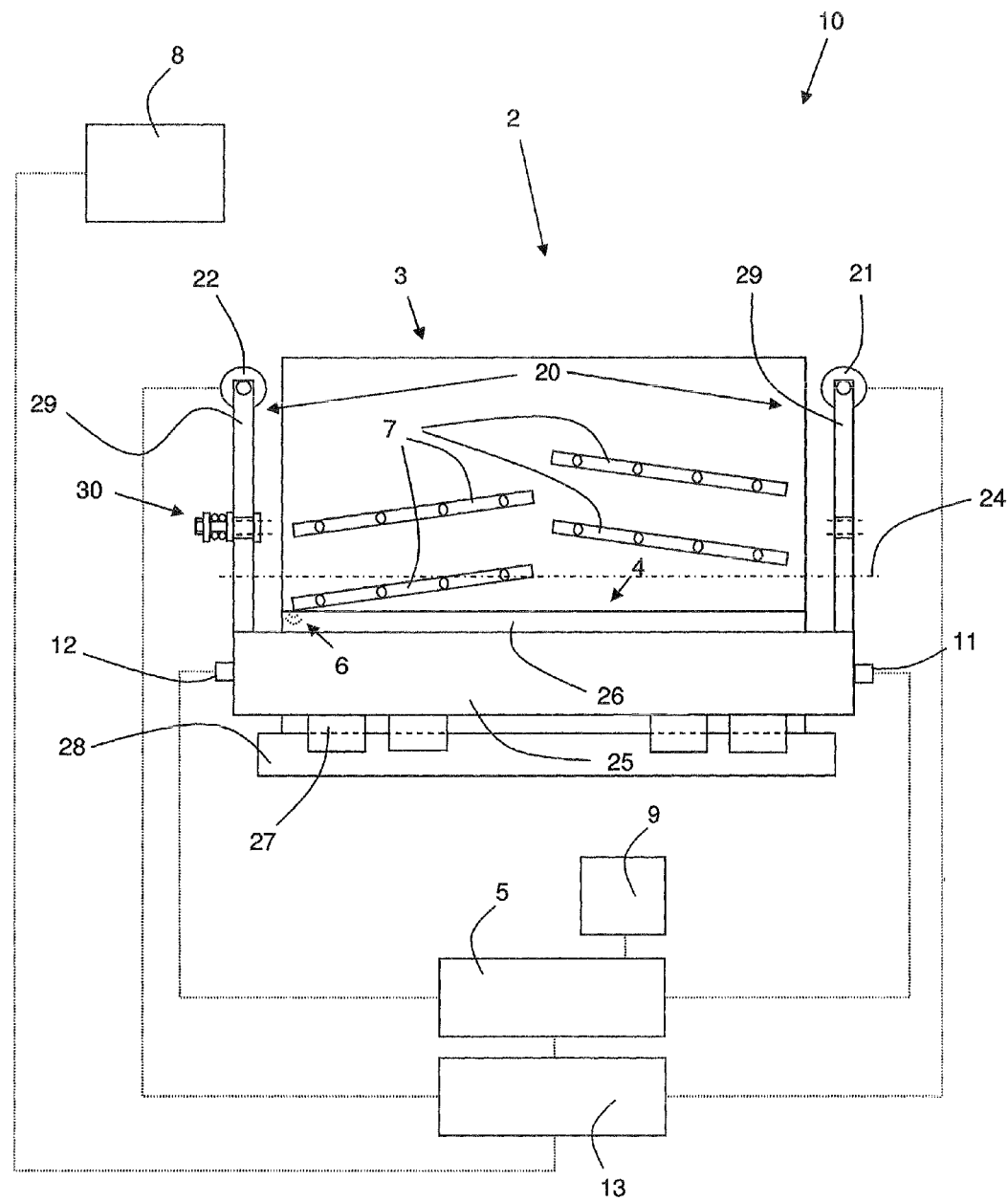
FIG. 3 depicts a device according to the invention, including the chopping assembly as depicted in FIG. 2, in a schematic view.

FIG. 3 shows, inter alia, in a schematic view, the chopper assembly 2 according to the line A-A shown in FIG. 2 from the front. A first and a second vibration sensor 11 and 12, respectively, are mounted at the shear bar carrier 25 at the two opposing end regions thereof. Since FIG. 2 is a side view from the left (relative to the direction of travel of the forage harvester), it only shows the first vibration sensor 11, which is located on the left side of the machine.

In the view depicted in FIG. 3, only four cutting blades 7 are shown of the cutting blades belonging to a plurality of further cutting blades (not shown) distributed around the circumference. The FIG. 3 depiction also shows that the cutting blades 7 are fastened to the chopper drum 3 in two rows in a V-shaped configuration.

FIGS. 2 and 3 show that the shear bar 4 is coupled to a control unit 20, by way of which the clearance position of the shear bar 4 relative to the chopper drum 3 can be changed. The control device 20 comprises two actuators in the form of electric actuating motors 21, 22, each of which is assigned to one side of the shear bar 4 and coupled thereto by a lever arm 29 in each case. For this purpose, a lever arm 29 which extends transversely to the rotational axis 24 of the chopper drum 3 is attached at each end of the shear bar carrier 25, laterally on the outside of the chopper drum 2 in each case. Each lever arm 29 is equipped with a friction brake 30. To this end, a passage is therefore formed at each lever arm 29, which, as indicated using an oval shape in FIG. 2, is larger than the cross section of a fixed brake pin, which extends therethrough. The lever arm 29 moves, therefore, with an amount of play predetermined by the passage, in order to allow adjusting motions of the shear bar 4. The play of the lever arm 29 is braked by a spring preload (cf. FIG. 3) applied to the brake pin.

Each of the dual-sided lever arms 29 is adjusted using a screw mechanism that is driven by a first actuating motor 21 and a second actuating motor 22, respectively. Each output axle of the motors 21, 22 is designed as a threaded spindle which engages in a spindle nut 23 mounted at the end of the lever arm 29 facing away from the shear bar 4. The clearance position of the shear bar 4 relative to the chopper drum 3 is therefore adjustable by actuating the motors 21, 22. Since the motors 21, 22 on both sides of the shear bar 4 are actuated independently of one another by way of a control device 13, it is possible to freely adjust, within mechanical limits, the clearance position of the shear bar 4. That is, the clearance as well as the orientation of the shear bar 4 (the angle thereof relative to the chopper drum 3) is adjustable.

The control device 13 also is connected to a sharpening device 8 for the knives 7, which is known per se and will therefore not be described in greater technical detail. The control device 13 initiates and terminates sharpening procedures by way of appropriate signaling.

The two vibration sensors 11 and 12 are connected via signal lines to a signal processing device in the form of a digital signal processor 5. Digital signal processor 5 is a microcontroller that operates at high frequency and which is suitable for filtering and analysis of input signals with a high sampling rate. That is, the signal processor 5 is suitable for comparing signals received from the vibration sensors 11, 12 with one another, wherein, more particularly, transit time differences between signals from the first sensor 11 are determined with respect to signals from the second sensor 12 and/or temporally sequential signals from the same sensor 11, 12 can be compared to one another.

The mode of operation of the device depicted in FIG. 3 is described as follows. In order to set a desired clearance between the shear bar 4 and the chopper drum 3 for the harvesting operation, for example, after a sharpening procedure has been carried out, the control device 13 activates, either automatically or manually by the machine operator, the actuating motors 21, 22 in order to move the shear bar 4 toward the rotating chopper drum 3. The actuating motors 21, 22 are preferably operated simultaneously for this purpose. Since the distance between the shear bar 4 and the chopper drum 3 continuously decreases, the counterblade bar 26 of the shear bar 4 eventually impacts at least one (possibly several or even all) of the rotating knives 7 of the chopper drum 3. The contact induces a vibration in the shear bar 4, the vibration source 6 of which is indicated, for example, by two dashed curves in FIG. 3. As shown therein, the contact occurs at a region of the counterblade bar 26 that faces the second sensor 12 (on the left side in the illustration).

The vibration caused by the contact propagates from the vibration source 6 outward into the shear bar 7 as a structure-borne acoustic vibration having a certain velocity. Since, in the case shown in FIG. 3, the vibration source 6 is located much closer to the sensor 12 than to the sensor 11, the sensor 12 detects the vibration sooner than does the sensor 11. For that matter, sensor 11 may not even detect the vibration at all if it has already been damped too much on the long path of propagation.

The common signal analysis device 5, which is ready to receive signals from both sensors 11, 12, deduces information about the origin of the vibration on the shear bar 4 on the basis of the presence of the signal from only the sensor 12. In the simplest case, the signal analysis device 5 simply allocates the vibration to one of the two sides of the shear bar 4, i.e., in the present case, to the side of the sensor 12 where the presence of a vibration is detected, since the side of the sensor 12 strikes the chopper drum 3.

In order to correct the tilted position of the shear bar 4, which was determined as described, with respect to the chopper drum 3, the control device 13 connected to the signal analysis device 5 actuates the actuating motors 21, 22 in such a way that a parallel position of the shear bar 4 is attained. To this end, for example, the motor 22 could be halted while the motor 21 continues to operate until a contact signal also is received from the sensor 11. The receipt of signals from both sensors 11, 12 therefore serves as an indicator for a parallel position of the shear bar 4 with respect to the chopper drum 3.

The signal analysis device 5 derives information about the origin of the vibration on the shear bar 4 from the points in time at which signals arrive from the sensors 11, 12, which are in different locations. By carrying out a suitable evaluation, it is therefore possible to perform a quantitative position determination of the vibration source that goes beyond a merely qualitative allocation to a particular side. To this end, the signal analysis device 5 determines a time offset in the sense of a transit time difference between the signals from the two sensors 11, 12. Since the position of the sensors 11, 12 and the design-related sound transit time in the shear bar 4 are known, the signal analysis device 5 is capable of quantitatively calculating the position of the vibration source 6 on the shear bar 4 on the basis of the transit time difference that was calculated. The invention thereby precisely controls the actuating motors 21, 22 in order to rapidly and accurately reach a parallel clearance position with respect to the chopper drum 3.

In deviation from the example shown, a vibration source could lie in another region of the shear bar 4. For example, if vibrations were caused in the central region of the shear bar 4, the vibration would occur at both sensors 11, 12 nearly simultaneously. The signals transmitted to the signal analysis device 5 would be simultaneous in this case.

Alternatively or in addition to a comparison of the time of arrival, it is also possible to analyze the signals that are received with respect to the duration thereof. For example, on the basis of relatively long signals that are caused by the tilted position of the knives 7 on the chopper drum 3 it can be deduced that contact takes place not only at one point, but also that the shear bar 4 and chopping blades 7 are in contact across a broader region.

The signal analysis device 5 may be used to initially filter out the contact signals caused by different knives 7 during rotation of the chopper drum 3 and to then compare them with one another in order to deduce therefrom the knife state and/or the state of the shear bar. To simplify the assignment of contact signals to individual knives 7, the chopper assembly 2 can be connected to a (not shown) rotational position sensor that transmits a rotational position of the chopper drum 3 to the signal analysis device.

If different signals (amplitude, signal length) at the knives 7 are detected during a pause in chopping, for example, this can be an indicator that a sharpening procedure is required since individual knives 7 obviously have geometries that differ from one another. Such a sharpening procedure could be triggered automatically, for example, by the control device 13 activating the sharpening device 8.

However, if signals that are nearly the same (comparable amplitude, signal length) are detected at different knives 7 after a sharpening procedure, this is an indication that a sharpening procedure can be terminated since the knives 7 now have the same geometry once more.

If a signal interruption is measured at the same point in time at all knife contacts after a sharpening procedure that cannot be eliminated by further sharpening, this is an indication that the shear bar 4 itself is worn.

In general, an output device 9 connected to the signal processor 5 can be provided, which outputs all types of states, which have been determined by the signal processor 5, to the machine operator in an acoustic and/or visual form.

The following list of reference signs of various elements mentioned above is included (as follows), for ease of explanation:

LIST OF REFERENCE CHARACTERS 1 forage harvester
2 chopping assembly
3 chopper drum
4 shear bar
5 digital signal processor
6 vibration source
7 knife
8 sharpening device
9 output unit
10 device
11 first sensor
12 second sensor
13 control device
14 front attachment
15 intake assembly
16 conditioning device
17 post-accelerator
18 transfer device
19 driver's cab
20 control unit
21 first actuating motor
22 second actuating motor
23 spindle nut
24 rotational axis
25 shear bar carrier
26 counterblade bar
27 pivot head
28 cross member
29 lever arm
30 brake As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for state detection of a cutting device (2) for agricultural crop, which cutting device (2) comprises a cutting tool (3) that is set into rotation with respect to a shear bar (4), wherein a clearance position of the shear bar (4) is changeable with respect to the cutting tool (3), comprising the steps of:
    assigning at least two interspaced sensors (11, 12) for detecting vibrations to the shear bar (4) caused by the cutting tool (3) upon contact with the shear bar (4);
    transmitting signals generated by the sensors (11, 12) to a common signal analysis device (5); and
    the common signal analysis device (5) comparing the signals and determining a state of the cutting device (2), including assigning signals received from the sensors (11, 12) to individual knives (7) of the chopper drum (3) and deducing information about an origin (6) of the detected vibrations on the shear bar (4) based on a presence of a signal from only one of the sensors (11, 12), or based on points in time of arrival of signals from each of the sensors (11, 12) or both.

2. The method according to claim 1, further comprising assigning a control unit (20) for adjusting the changeable clearance position of the shear bar (4), wherein the control unit (20) is actuated by a control device (13).

3. The method according to claim 2, wherein the control unit (20) comprises two actuators (21, 22), each of which actuators (21, 22) is assigned to one side of the shear bar (4), is coupled thereto and is actuated separately using the control device (13) enabling adjustment of the clearance position of the shear bar (4) one side at a time.

4. The method according to claim 1, wherein the control device (13) takes into account a state of the cutting device (2) derived by the signal analysis device (5) in the adjustment of a desired clearance position of the shear bar (4).

5. The method according to claim 1, wherein the cutting tool (3) is a chopper drum equipped with a plurality of knives (7).

6. The method according to claim 1, wherein the signal analysis device (5) is connected to a rotational position sensor that transmits a rotational position of the cutting tool (3) to the signal analysis device (5).

7. A device (10) for state detection of a cutting device (2) for agricultural crop, the cutting device (2) comprising:
    a cutting tool (3) that is set into rotation with respect to a shear bar (4) and configured so that a clearance position of the shear bar (4) is changeable with respect to the cutting tool (3);
    at least two interspaced sensors (11, 12) for detecting vibrations are assigned to the shear bar (4), which vibrations are caused by the cutting tool (3) upon contact with the shear bar (4); and
    a signal analysis device (5) that operates to receive the signals of the sensors (11, 12) and compares the signals with one another in order to determine a state of the cutting device (2), including assigning signals received from the sensors (11, 12) to individual knives of the chopper drum;
    wherein the signal analysis device deduces information about an origin (6) of the detected vibrations on the shear bar (4) based on a presence of a signal from only one of the sensors (11, 12), or based on points in time of arrival of the signals from each of the sensors (11, 12) or both.

8. The device according to claim 7, wherein the shear bar (4), machine elements adjacent thereto or both comprises means for damping structure-borne acoustic vibrations in the shear bar (4).

9. The device according to claim 7, further comprising an output unit (9) for outputting the determined state of the cutting device (2) to an operator of the cutting device (2).

* * * * *